(12) United States Patent
Löbbert (10) Patent No.: US 12,352,718 B2
(45) Date of Patent: Jul. 8, 2025

(54) ELECTROCHEMICAL HALF-CELL, ELECTROCHEMICAL SENSOR, MANUFACTURING METHOD OF SOLID ELECTROLYTE AND ELECTROCHEMICAL HALF-CELL, AND USE OF SOLID ELECTROLYTE IN ELECTROCHEMICAL HALF-CELL

(71) Applicant: Endress+Hauser Conducta GmbH+Co. KG, Gerlingen (DE)

(72) Inventor: Andreas Löbbert, Waldheim (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 658 days.

(21) Appl. No.: 17/530,243

(22) Filed: Nov. 18, 2021

(65) Prior Publication Data
US 2022/0170876 A1  Jun. 2, 2022

(30) Foreign Application Priority Data

Nov. 27, 2020 (DE) .................... 10 2020 131 541.4

(51) Int. Cl.
*H01M 10/058*  (2010.01)
*C01G 53/04*  (2025.01)
(Continued)

(52) U.S. Cl.
CPC ........... *G01N 27/301* (2013.01); *C01G 53/04* (2013.01); *G01N 27/31* (2013.01); *G01N 27/333* (2013.01)

(58) Field of Classification Search
CPC ........ C01G 53/04; C01G 53/66; C01G 53/70; C01G 55/004; H01M 10/0562;
(Continued)

(56) References Cited

U.S. PATENT DOCUMENTS

2003/0150726 A1  8/2003  West et al.
2011/0308947 A1  12/2011  Wilke
(Continued)

FOREIGN PATENT DOCUMENTS

CN  103175878 A  6/2013
CN  105823814 A  8/2016
(Continued)

OTHER PUBLICATIONS

Osenciat et al., "Charge compensation mechanisms in Li-substituted high-entropy oxides and influence on Li superionic conductivity," J Am Ceram Soc. 2019;102:6156-6162 (Year: 2019).*
(Continued)

*Primary Examiner* — Matthew E. Hoban
*Assistant Examiner* — Lynne Edmondson
(74) *Attorney, Agent, or Firm* — Gil M. Repa; Endress+Hauser (USA) Holding, Inc.

(57) ABSTRACT

An electrochemical half-cell includes an electrical terminal lead in contact with a solid electrolyte, wherein the solid electrolyte includes a doped high-entropy oxide. The electrochemical half-cell can be used as either a reference half-cell or a measuring half-cell. Methods of manufacturing the solid electrolyte and the electrochemical half-cell are further disclosed.

2 Claims, 5 Drawing Sheets

(51) Int. Cl.
| | |
|---|---|
| G01N 27/30 | (2006.01) |
| G01N 27/31 | (2006.01) |
| G01N 27/333 | (2006.01) |
| H01M 10/056 | (2010.01) |
| H01M 10/0562 | (2010.01) |

(58) Field of Classification Search
CPC ........... H01M 10/056; H01M 10/0561; H01M 10/058; C01P 2002/54
See application file for complete search history.

(56) References Cited

U.S. PATENT DOCUMENTS

| | | |
|---|---|---|
| 2012/0325659 A1 | 12/2012 | Hanko et al. |
| 2018/0118576 A1 | 5/2018 | Ahlborg et al. |
| 2020/0109479 A1 | 4/2020 | Balema et al. |
| 2020/0110052 A1 | 4/2020 | Huo et al. |

FOREIGN PATENT DOCUMENTS

| | | |
|---|---|---|
| CN | 107994228 A | 5/2018 |
| CN | 109906374 A | 6/2019 |
| DE | 102013101420 A1 | 8/2014 |
| DE | 102016202083 A1 | 8/2017 |
| DE | 102018100928 A1 | 7/2019 |
| DE | 102019103167 A1 | 8/2020 |
| DE | 102019103171 A1 | 8/2020 |
| EP | 3309541 B1 | 8/2020 |
| EP | 3526593 B1 | 8/2020 |
| WO | 2020142125 A2 | 7/2020 |

OTHER PUBLICATIONS

Berardan et al., "Room temperature lithium superionic conductivity in high entropy oxides", Journal or Materials Chemistry A, 2016, 4, pp. 9536-9541. (Year: 2016).*
Bérardan, D., et al., Room temperature lithium superionic conductivity in high entropy oxides, Journal of Materials Chemistry A, vol. 4, pp. 9536-9541 (2016).
Chen, H., et al., Mechanochemical Synthesis of High Entropy Oxide Materials under Ambient Conditions: Dispersion of Catalysts via Maximization, ACS Materials Lett., vol. 1, pp. 83-88 (supporting materials included).
Rost, et al., Entropy-stabilized oxides, Nature Communications, DOI: 10.1038/ncomms9485, www.nature.com/naturecommunications, Sep. 29, 2015, 8 pp.
Bérardan, et al., Colossal dielectric constant in high entropy oxides, Phys. Status Solidi RRL 10, No. 4, 328-333 (2016), DOI 10.1002/pssr.201600043, 6 pp.
Bérardan, et al., Room temperature lithium superionic conductivity in high entropy oxides, Royal Society of Chemistry, J. Mater. Chem. A, 2016, 4, 9536-9541, 6 pp.
History of high entropy oxides, 10 pp.
Musicó, et al., The emergent field of high entropy oxides: Design, prospects, challenges, and opportunities for tailoring material properties, APL Mater. 8, 040912 (2020); https://doi.org/10.1063/5.0003149, 17 pp.
Biesuz, et al., Synthesis and sintering of (Mg, Co, Ni, Cu, Zn)O entropy-stabilized oxides obtained by wet chemical methods, J Mater Sci (2018) 53:8074-8085.
Qiu, et al., A high entropy oxide (Mg0.2Co0.2Ni0.2Cu0.2Zn0.2O) with superior lithium storage performance, Journal of Alloys and Compounds 777 (2019) 767-774.
Berardan, et al., Controlled Jahn-Teller distortion in (MgCoNiCuZn)O-based high entropy oxides, Journal of Alloys and Compounds 704 (2017) 693-700.
Chen, et al., Mechanochemical Synthesis of High Entropy Oxide Materials under Ambient Conditions: Dispersion of Catalysts via Entropy Maximization, ACS Materials Lett. 2019, 1, 83-88.
Facchia, et al, Stabilization by Configurational Entropy of the Cu(II) Active Site during CO Oxidation on Mg02. Co0.2Ni0.2Cu0.2Zn0. 2O, J. Phys. Chem. Lett. 2020, 11, 3589-3593.
Krzyszczyk, Dominika, Structure, microstructure and electrical properties of high-entropy spinels fabricated by different synthesis methods (PL version), DOI: 10.13140/RG.2.2.35162.77762, Jul. 2020, 138 pp.
Osenciat, et al., Charge compensation mechanisms in Li-substituted high-entropy oxides and influence on Li superionic conductivity, J Am Ceram Soc. 2019;102:6156-6162.
Oses, et al., High-entropy ceramics, https://doi.org/10.1038/s41578-019-0170-8, vol. 5, Apr. 2020, 295-309.
Usharani, et al., Role of size, alio-multi-valency and non-stoichiometry in the synthesis of phase-pure high entropy oxide (Co,Cu,Mg,Na,Ni,Zn)O, Dalton Trans.2020, 49, 7123-7132.
Amiri, et al., Recent progress of high-entropy materials for energy storage and conversion, J. Mater. Chem. A, 2021, 9, 782-823.
Rost, Christina Mary, Entropy-Stablized Oxides: Explorations of a Novel Class of Multicomponent Materials, 2016, 227 pp.
Zhao, et al., High-Entropy Layered Oxide Cathodes for Sodium-Ion Batteries, Angew. Chem. Int. Ed. 2020, 59, 264-269.
Bérardan et al., Room Temperature lithium superionic conductivity in high entropy, Journal of Materials Chemistry A, vol. 04, pp. 9536-9941, May 24, 2016.

* cited by examiner

ELECTROCHEMICAL HALF-CELL, ELECTROCHEMICAL SENSOR, MANUFACTURING METHOD OF SOLID ELECTROLYTE AND ELECTROCHEMICAL HALF-CELL, AND USE OF SOLID ELECTROLYTE IN ELECTROCHEMICAL HALF-CELL

CROSS-REFERENCE TO RELATED APPLICATION

The present application is related to and claims the priority benefit of German Patent Application No. 10 2020 131 541.4, filed on Nov. 27, 2020, the entire contents of which are incorporated herein by reference.

TECHNICAL FIELD

The present disclosure relates to an electrochemical half-cell, an electrochemical sensor, a manufacturing method for a solid electrolyte and an electrochemical half-cell, and to the use of a solid electrolyte in an electrochemical half-cell.

BACKGROUND

In analytical measurement technology, for example, in the fields of water management, of environmental analysis, in industry, for example, in food technology, biotechnology and pharmaceuticals, as well as for the most varied laboratory applications, measurands, such as a pH value, a conductivity, or even concentration of analytes, such as ions or dissolved gases in a gaseous or liquid measurement medium, are of great importance. These measurands can be captured and/or monitored, for example, by means of electrochemical sensors, such as potentiometric or amperometric sensors.

A variant of potentiometric sensors are the so-called ion-selective sensors having an ion-selective electrode, such as a pH sensor, a sodium sensor, a potassium sensor, an ammonium sensor, or a carbonate sensor. In its interior, this electrode generally has a liquid or gel electrolyte, which is necessary for ion conduction.

However, a disadvantage of liquid or gel electrolytes is that they can under certain circumstances leach out, toxify the discharge line in the sensor, or even clog the liquid transition, which leads to rapid aging and thus a shortened service life of the sensor. The measurement results of such sensors also have a flow dependence at high flow velocities.

A further disadvantage of conventional ion-selective sensors with a liquid or gel electrolyte is that the form factor of the sensor is relatively large due to the electrolyte so that these sensors can only be introduced in a complicated manner into, for example, single-use bags.

In addition, such sensors require a complex and thus cost-intensive manufacturing method. Such sensors usually also include a fragile glass tube. In addition, such sensors usually extend into the measurement medium that is to be measured, which can result in a strong mechanical load on the sensor.

SUMMARY

It is therefore an object of the present disclosure to provide a precise, durable and compact ion-sensitive sensor.

This object is achieved by an electrochemical half-cell according to the present disclosure.

The electrochemical half-cell according to the present disclosure comprises an electrical terminal lead and a solid electrolyte in contact with the electrical terminal lead. The solid electrolyte may comprise a doped high-entropy oxide.

The electrochemical half-cell according to the present disclosure makes it possible for an electrochemical sensor equipped with the half-cell according to the present disclosure to have an extremely long operational life. This is due to use of the solid electrolyte with doped high-entropy oxide, which has excellent conductivity even over longer periods of use and thus leads to optimal measurement results. The solid electrolyte also enables an extremely compact design of the electrochemical half-cell, whereby the form factor for the electrochemical sensor is minimized. Because of the low volume of the sensor, it is possible to minimize projection of the sensor into the measurement medium.

According to embodiments of the present disclosure, the doped high-entropy oxide is doped with lithium ions and/or sodium ions.

According to embodiments of the present disclosure, the doped high-entropy oxide comprises a material of the following group:
- $(MgCoNiCuZn)_{1-x-y}Ga_yA_xO$;
- $(MgCoNiCuZn)1-xLixO$;
- $(MgCoNiCuZn)1-xNaxO$;
- $(MgCoNiCuZn)1-2xLixGaxO$;
- Na+ or Li+ doped $(Co0.2Cu0.2Mg0.2\ Ni0.2Zn0.2)O$ (rock-salt-type R-HEO);
- Na+ or Li+ doped $(Ce0.2Zr0.2Hf0.2Sn0.2Ti0.2)O2$ (fluorite-type F-HEO); and
- Na+ or Li+ doped $(Gd0.2La0.2Nd0.2Sm0.2Y0.2)MnO3$ (perovskite-type PE-HEOs), wherein A stands for Li or Na, and x is a value between 0 and 1, and y is a value between 0 and 1 minus x.

According to embodiments of the present disclosure, the terminal lead comprises at least one material from the following group: platinum, gold, palladium, copper, silver, calomel, Ag/AgCl, redox polymer, redox substances, redox mediator substances, graphite, metal/metal oxide, metal/metal halides and metal/metal sulfide.

According to embodiments of the present disclosure, the electrochemical half-cell comprises a housing having an opening to come into electrochemical contact with a measurement medium. The electrical terminal lead extends out of the housing.

According to embodiments of the present disclosure, the housing comprises ceramic, glass ceramic, glass, plastic, or a metal coated with a non-electrically or non-ionically conductive material.

According to embodiments of the present disclosure, the electrochemical half-cell has an ion-conductive element that closes the first opening.

According to embodiments of the present disclosure, the ion-conductive element is a membrane so that the electrochemical half-cell can be used as a measuring half-cell.

According to embodiments of the present disclosure, the ion-conductive element is an electrochemical junction so that the electrochemical half-cell can be used as a reference half-cell.

This object is furthermore achieved by an electrochemical sensor according to the present disclosure.

The electrochemical sensor according to the present disclosure comprises a first electrochemical half-cell according to the present disclosure and a second electrochemical half-cell according to the present disclosure. The first electrochemical half-cell is used as a measuring half-cell, and the second electrochemical half-cell is used as a reference half-cell. The terminal lead of the first electrochemical half-cell and the terminal lead of the second electrochemical half-cell are connected to an electronic unit.

According to embodiments of the present disclosure, the first electrochemical half-cell and the second electrochemical half-cell have a common housing.

The object is furthermore achieved by a manufacturing method for a solid electrolyte as a doped high-entropy oxide according to the present disclosure.

The manufacturing method according to the present disclosure comprises the following steps:
mixing first components, wherein the first components comprise oxides and/or carbonates and/or nitrates of each of the following substances: Mg, Co, Ni, Cu, Zn;
mixing the first component with at least one second component so that a first mixture is formed, wherein the second component comprises oxides and/or carbonates and/or nitrates of at least one of the following substances: Ga, Li, Na, Pt, Ru;
heating the first mixture to a temperature between 100° C. and 1300° C.; and
aerating the heated first mixture so that the first mixture is quenched.

The object is furthermore achieved by an alternative manufacturing method for a solid electrolyte according to the present disclosure.

The manufacturing method according to the present disclosure comprises the following steps:
mixing the following third components: NiO(RS), MgO (RS), CoO(RS), CuO(T), and ZnO(W) and $Li_2O$, and/or $PtO_2$ and/or $RuO_2$, wherein RS stands for rock salt and W for wurtzite and T for tenorite, so that a second mixture is formed; and
grinding or compressing the second mixture.

According to one embodiment of the present disclosure, after the step of grinding, the first mixture or the second mixture is either:
thermally pressed or melted or partially melted so that in each case a water-impermeable substrate is formed; or
cast into a polymer mass, for example, polyethylene oxides or polyvinyl alcohol, and autoclaved or tempered so that a homogeneous substrate is formed; or
embedded in sol-gel.

According to embodiments of the present disclosure, the first components additionally comprise platinum and/or ruthenium.

The object is furthermore achieved by an alternative manufacturing method for a solid electrolyte according to the present disclosure.

The manufacturing method according to the present disclosure comprises the following steps:
dissolving nitrates and/or carbonates of the metals Li, Cu, Co, Ni, Mg, and Zn in water so that a saline solution is formed; and
spray-pyrolyzing the saline solution into a housing or onto a surface.

The object is furthermore achieved by a manufacturing method for an electrochemical half-cell according to the present disclosure.

The manufacturing method according to the present disclosure comprises the following steps:
providing a solid electrolyte according to the present disclosure;
introducing the solid electrolyte into a housing, wherein the housing has an opening; and
introducing an electrical terminal lead into the housing such that the solid electrolyte is in contact with the electrical terminal lead.

The object is furthermore achieved by an alternative manufacturing method for an electrochemical half-cell according to the present disclosure.

The manufacturing method according to the present disclosure comprises the following steps:
providing a saline solution of nitrates and/or carbonates of the metals Li, Cu, Co, Ni, Mg, and Zn; and
spray-pyrolyzing the saline solution into a housing, onto a substrate, or onto an electrical terminal lead such that a solid electrolyte is formed,
wherein, when the solid electrolyte has been formed in the housing or on the substrate, the method further comprises introducing an electrical terminal lead into the solid electrolyte such that the solid electrolyte is in contact with the electrical terminal lead.

The object is furthermore achieved by use of a solid electrolyte with a doped high-entropy oxide in an electrochemical half-cell according to the present disclosure.

BRIEF DESCRIPTION OF THE DRAWINGS

The present disclosure is explained in more detail on the basis of the following description of the FIGS. The following are shown.

DETAILED DESCRIPTION

Figure 1:
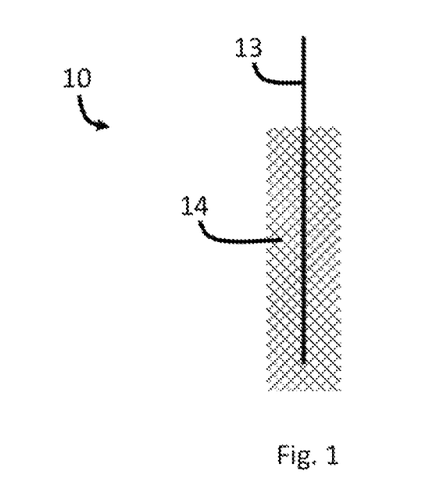
FIG. 1 shows a schematic representation of an electrochemical half-cell according to the present disclosure.

FIG. 1 shows a basic embodiment of the electrochemical half-cell 10 according to the present disclosure with an electrical terminal lead 13 and a solid electrolyte 14. The electrical terminal lead 13 is in contact with the solid electrolyte 14 to enable electron transport. The electrochemical half-cell 10 shown in FIG. 1 is suitable for use as a reference half-cell.

In all described embodiments, the solid electrolyte 14 comprises a doped high-entropy oxide, a so-called HEOx. Doped high-entropy oxides have proven to be a suitable material for a solid electrolyte due to their high conductivity ($1 \times 10^{-7}$ to $1 \times 10^{-3}$ $S/cm^{-1}$ between 20° C. and 80° C.). A doped high-entropy oxide, as the term is used herein, may also be understood to mean a doped medium-entropy oxide, a so-called MEOx.

The reason for the good conductivity of the HEOx substances is the high degree of disorder in the crystals. Entropy-stabilized substances have a crystal lattice with cubic symmetry in which the oxygen atoms are arranged regularly, for example, in the form of a cube. In addition, metal ions that are mixed in repeatedly occupy the regular locations of the oxygen. As a result, the metal ions are scattered completely randomly over cubic base lattices. In the state of maximum disorder, the atoms have the same distance everywhere. The solid electrolyte 14 may be structured in a single phase. This means that the solid electrolyte 14 has a homogeneous material structure.

The doped high-entropy oxide may be doped with lithium ions and/or sodium ions. HEOx materials doped with lithium and sodium have high conductivities, namely up to $10^{-3}$ S/cm$^{-1}$ for lithium and $10^{-6}$ S/cm$^{-1}$ for sodium, even at room temperatures, thus enabling a stable measurement by the sensors. The lithium and sodium contents are preferably between 2% and 50%, particularly advantageously between 10% and 35% of the total mass of the solid electrolyte 14.

The doped high-entropy oxide preferably comprises a material of the following group: $MgCoNiCuZn_{1-x-y}Ga_yA_xO$, $MgCoNiCuZn_{1-x}Li_xO$, $MgCoNiCuZn_{1-x}Na_xO$, $MgCoNiCuZn_{1-2x}Li_xGa_xO$, $Na^+$ or $Li^+$ doped $Co_{0.2}Cu_{0.2}Mg_{0.2}Ni_{0.2}Zn_{0.2}O$ rock-salt-type HEO (R-HEO), $Na^+$ or $Li^+$ doped $Ce_{0.2}Zr_{0.2}Hf_{0.2}Sn_{0.2}Ti_{0.2}O_2$ fluorite-type HEO (F-HEO), and $Na^+$ or $Li^+$ doped $Gd_{0.2}La_{0.2}Nd_{0.2}Sm_{0.2}Y_{0.2}MnO_3$ perovskite-type HEOs (PE-HEOs). In at least one embodiment, x=0.3 and y=0.7.

Figure 2:
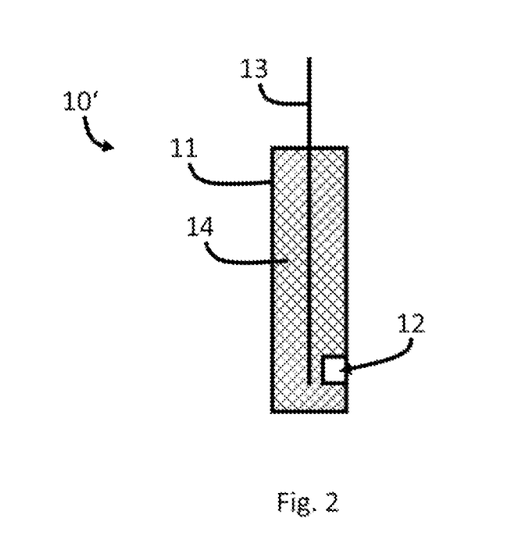
FIG. 2 shows a schematic representation of an embodiment of the electrochemical half-cell according to the present disclosure of FIG. 1.

FIG. 2 shows an alternative embodiment to the electrochemical half-cell 10 shown in FIG. 1. The electrochemical half-cell 10' additionally has a housing 11 with an opening 12. The housing 11 is at least partially filled with the solid electrolyte 14.

The housing 11 may be made of a non-conductive material, such as ceramic or glass ceramic. The housing 11 is coated, for example, with stainless steel, titanium, or Hastelloy. However, if the electrochemical half-cell 10' is to be used as a reference half-cell, the housing 11 may also be made of a conductive material. In this embodiment, the solid electrolyte 14 is suitable for being in direct contact with the measurement medium via the opening 12. The housing 11 may also be designed as an insulating coating of the solid electrolyte 14.

The opening 12 of the electrochemical half-cell 10' is designed such that when the electrochemical half-cell 10' is immersed in a measurement medium, the measurement medium may come into contact with the solid electrolyte 14 via the opening 12. The opening 12 and/or the housing 11 may be designed such that the opening 12 can be covered by a flat glass, for example, a flat glass can be melted onto the opening 12.

The electrical terminal lead 13 of the electrochemical half-cell 10' is led out of the housing 11 so that an electrical potential can be tapped. For example, the electrical terminal lead 13 comprises platinum, gold, palladium, copper, silver, calomel, Ag/AgCl, redox polymer, redox substances, redox mediator substances, graphite, metal/metal oxide, metal/metal halides, or metal/metal sulfide.

The solid electrolyte 14 of the electrochemical half-cell 10' is arranged in the housing 11 such that the solid electrolyte 14 is in contact with the electrical terminal lead 13 and is suitable for coming into electrochemical contact with a measurement medium by means of the opening 12.

Figure 3:
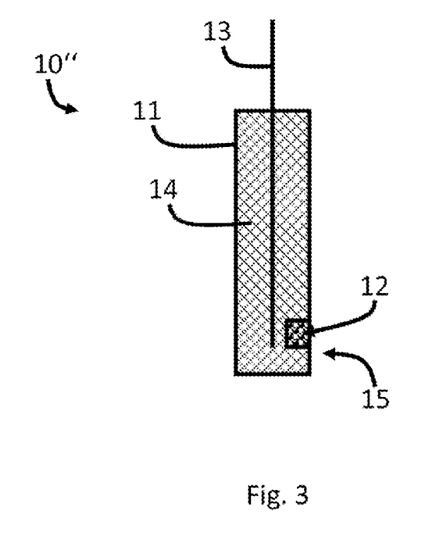
FIG. 3 shows a schematic representation of a further embodiment of the electrochemical half-cell according to the present disclosure of FIG. 1 as a reference half-cell.

FIG. 3 shows a further embodiment of the electrochemical half-cell 10, 10' shown in FIGS. 1 and 2. In addition to the electrochemical half-cell 10', the electrochemical half-cell 10" has an ion-conductive element 15 that closes off the first opening 12. In further embodiments, the ion-conductive element 15 may be a membrane or an electrochemical junction or a liquid junction.

Figure 4:
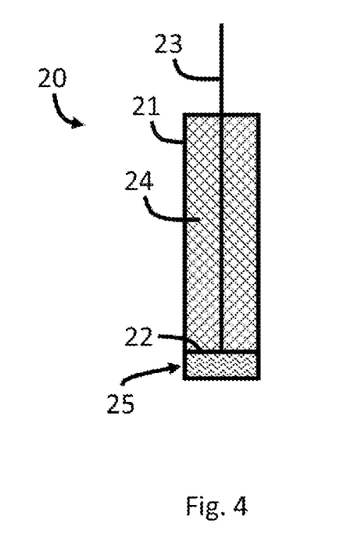
FIG. 4 shows a schematic representation of a further alternative embodiment of the electrochemical half-cell according to the present disclosure of FIG. 1 as a measuring half-cell.

FIG. 4 shows a further embodiment of the electrochemical half-cells shown in FIGS. 1, 2 and 3. The measuring half-cell 20 shown in FIG. 4 includes a membrane 25 as an ion-conductive element (e.g., the ion-conductive element 15).

Figure 5:
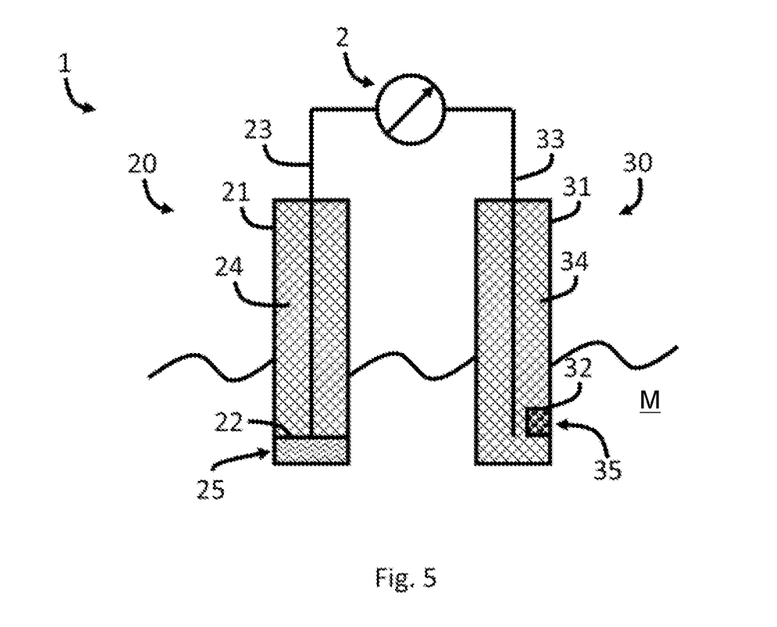
FIG. 5 shows a schematic representation of an electrochemical sensor according to the present disclosure.

FIG. 5 shows an electrochemical sensor 1 with two electrochemical half-cells according to the present disclosure, a first half-cell, which functions as a measuring half-cell 20, and a second half-cell, which functions as a reference half-cell 30. The electrochemical sensor 1 furthermore has an electronic unit 2.

For the sake of simplicity, the same reference numerals are used below for the reference numerals of the features of the first half-cell, e.g., of the measuring half-cell 20, and of the second half-cell, e.g., of the reference half-cell 30, as are used for the corresponding features of the electrochemical half-cell 10 introduced above. The tens digits of the reference numerals of these features are in each case matched to the measuring half-cell 20 or to the reference half-cell 30.

The terminal lead 23 of the measuring half-cell 20 and the terminal lead 33 of the reference half-cell 30 are in each case led out of the housing 21, 31 and electrically connected to the electronic unit 2.

The electronic unit 2 is configured for measuring a voltage difference between the measuring half-cell 20 and the reference half-cell 30. The electronic unit 2 also may be configured for converting the measured value into an analyte content representing the analyte present in a measurement medium M. In at least one embodiment, the electronic unit 2 may include circuitry and/or a processor configured for the measuring and/or the converting functions described herein.

In FIG. 5, the measuring half-cell 20 includes a membrane 25 as an ion-conductive element. The membrane is, for example, ion-selective and at least slightly ion-conductive. The reference half-cell 30 has an electrochemical junction 35 as an ion-conductive element. The junction is, for example, permeable to certain ions.

During operation, the electrochemical sensor 1 is immersed in the measurement medium M such that the membrane 25 and the junction 35 are in contact with the measurement medium M.

Figure 6:
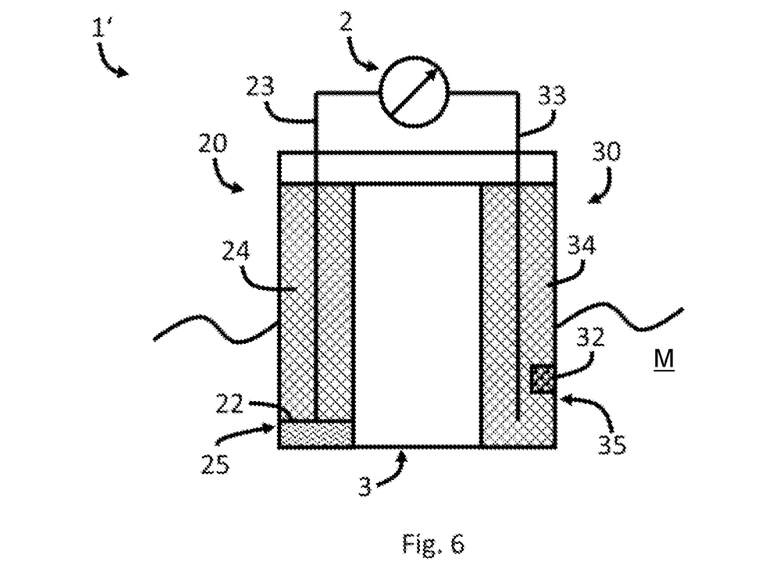
FIG. 6 shows a further embodiment of the electrochemical sensor shown in FIG. 4.

FIG. 6 shows an alternative embodiment of the electrochemical sensor 1. The electrochemical sensor 1' shown in FIG. 6 differs from the electrochemical sensor 1 shown in FIG. 5 in that the measuring half-cell 20 and the reference half-cell 30 are accommodated in a common housing 3. Such a sensor is also called a combination electrode.

Figure 7:
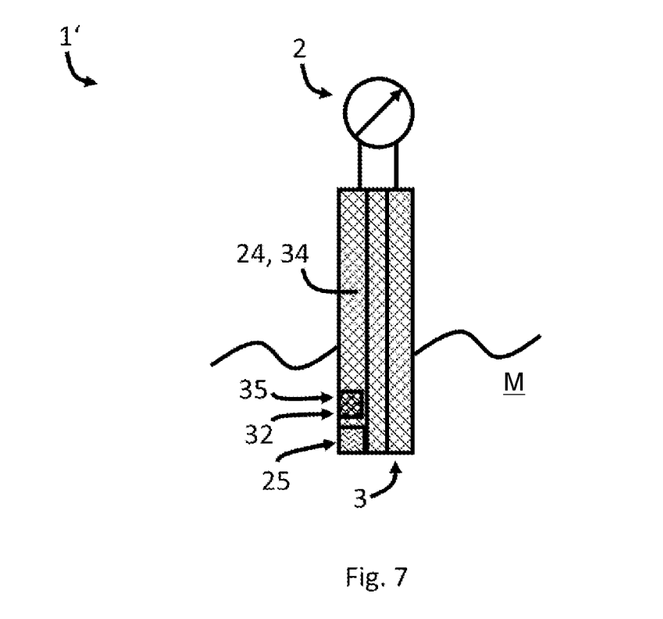
FIG. 7 shows a side view of the electrochemical sensor shown in FIG. 5.

The membrane 25 of the measuring half-cell 20 and the junction 35 of the reference half-cell 30 are preferably arranged on the same side, for example, the front side of the electrochemical sensor 1' (see FIG. 7, which is a side view of FIG. 6). For example, the electrochemical sensor 1' can be arranged in a fitting in a container such that only the side with the membrane 25 and with the junction 35 comes into contact with the measurement medium M.

Figure 8:
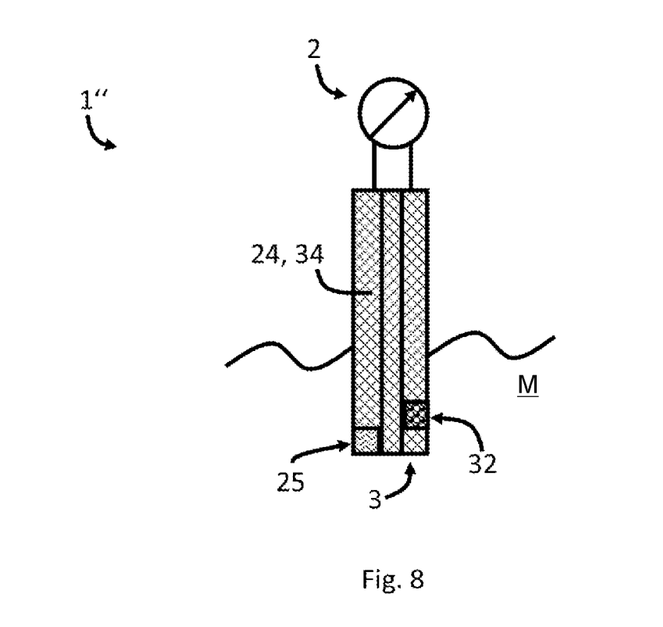
FIG. 8 shows a side view of an alternative embodiment of the electrochemical sensor shown in FIG. 6.

A further alternative embodiment of the electrochemical sensor 1 is shown in FIG. 8. The electrochemical sensor 1" shown in FIG. 8 differs from the electrochemical sensor 1' shown in FIG. 7 in that the membrane 25 and the junction 35 are arranged on different sides of the electrochemical sensor 1". For example, the membrane 25 is arranged on a front side, and the junction 35 is arranged on a rear side.

Figure 9:
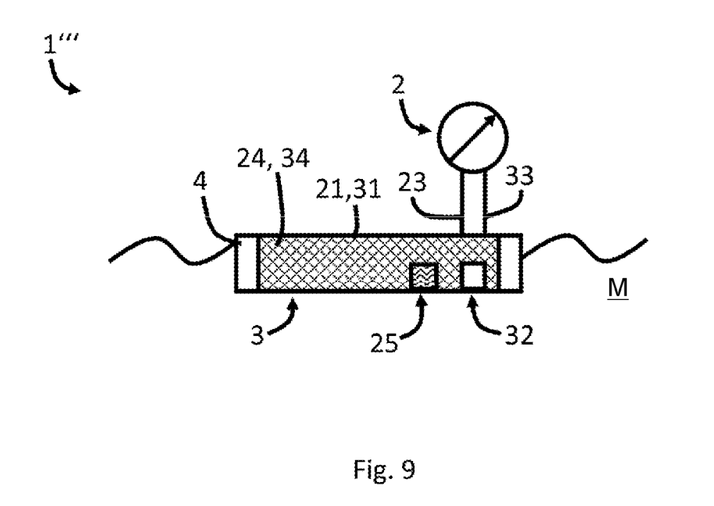
FIG. 9 shows a schematic side view of an additional embodiment of the electrochemical sensor shown in FIG. 6.

As illustrated in FIG. 9, instead of the junction 35, only one opening 32 can also be arranged in the housing 31. FIG. 9 shows a side view of another embodiment of the electrochemical sensor 1. For example, the electrochemical sensor 1''' additionally has a holder 4 with which the electrochemical sensor 1''' can be accommodated by a fitting or welded into a single-use container (e.g., a fermenter bag) for a non-invasive measurement.

In the following, the manufacturing method for the solid electrolyte 14 as a doped high-entropy oxide is described.

According to a first embodiment of the manufacturing method, first components are mixed in a first step. The first components comprise oxides and/or carbonates and/or nitrates of each of the following metals: Mg, Co, Ni, Cu and Zn. The oxides comprise: MgO, $Co_3O_4$, $Ni_2O_3$ (may preferably be used in the tempering), CoO, NiO (also possible and preferably to be used during grinding and compressing) CuO and ZnO. The carbonates comprise: $MgCO_3$, $CoCO_3$, $NiCO_3$, $CuCO_3$ and $ZnCO_3$. The nitrates comprise: $Mg(NO_3)_2$, $Co(NO_3)_2$, $Ni(NO_3)_2$, $Cu(NO_3)_2$, $Zn(NO_3)_2$. The first components are preferably mixed in an equimolar ratio.

According to at least one embodiment, the first components contain: NiO, CoO, ZnO, $Li_2O$, MgO, or CuO.

In a further step, which can also be performed simultaneously with the first step, at least one second component is mixed into the first components such that a first mixture is formed. The second components comprise oxides and/or carbonates and/or nitrates of at least one of the following substances: Ga, Li, Na, Pt, and Ru. The carbonates of the second components comprise, for example: $Ga_2(CO_3)_3$, $Li_2CO_3$ or $Na_2CO_3$, $PtCO_3$, $RuCO_3$. Nitrates, for example: $LiNO_3$, $NaNO_3$, $Ga(NO_3)_3$. Oxides, for example: $Li_2O$, $Na_2O$, $Ga_2O_3$, $PtO_2$, $RuO_2$.

The first components and the second components may also be referred to as precursors.

The first mixture is then heated to a temperature between 100° C. and 1300° C. The temperature is preferably maintained for several hours, for example, 12 hours. The temperature preferably does not exceed 1300° C. to avoid volatilization of Li compounds, for example, $Li_2CO_3$. This process is also called tempering.

After heating, the first mixture is aerated such that the first mixture is quenched. An oxygen mixture other than air can also be used as the quencher.

As an alternative to the heating and aeration step, the mixture may also be ground and compressed. In this embodiment, the first mixture is ground such that the first mixture becomes a powder. The grinding process is performed, for example, by means of a ball mill or planetary mill. The first mixture is ground, for example, at rotational speeds of 300 revolutions per minute for 60 minutes. In this case, the mixture is compressed after the grinding process. The mixture may be compressed into pellets.

According to a second embodiment of the manufacturing method, the following third components are used in a first step: NiO(RS), MgO(RS), CoO(RS), CuO(T), and ZnO(W) and $Li_2O$, thus forming a second mixture. The abbreviation RS stands for rock salt, the abbreviation W stands for wurtzite, and the abbreviation T stands for tenorite.

The second mixture is then ground or compressed. The step of grinding and/or compressing may be identical to that of the first embodiment.

By grinding or compressing the second mixture, the second mixture is converted into a single phase. The grinding or compressing was preferably performed at room temperature. Temperatures below 75° C. can also arise, for example, from the mechanical energy generated during grinding or compressing. Grinding is performed, for example, for a period of 2 hours.

According to one embodiment of the present disclosure, after the step of grinding the first mixture or the second mixture:

the first mixture or the second mixture is thermally compressed or melted so that in each case a water-impermeable substrate is formed; or cast into a polymer mass, and autoclaved or tempered so that a homogeneous mass is created; or the first mixture or second mixture is embedded in sol-gel.

According to a further embodiment of the manufacturing method, in a first step, a saline solution is created of nitrates and/or carbonates of each of the following metals: Li, Cu, Co, Ni, Mg, and Zn.

The manufacturing method for the electrochemical half-cell 10, 20, 30 is described below.

According to a first embodiment of the manufacturing method for an electrochemical half-cell, the solid electrolyte 14 is produced in a first step according to any one of the first manufacturing methods, second manufacturing methods, or third manufacturing methods of the solid electrolyte that are described above. The solid electrolyte 14 is then brought into contact with an electrical terminal lead 13. The electrochemical half-cell 10, 30 produced in this way is suitable for use as a reference half-cell in an electrochemical sensor 1, 1', 1".

According to an alternative second embodiment of the manufacturing method for an electrochemical half-cell, the solid electrolyte 14 is introduced into the housing 11, 31 of the electrochemical half-cell 10, 20, 30 after its above-described manufacture. The introduction can be by pouring in the solid electrolyte 14 in liquid form. In this case, the electrical terminal lead 13, 33 is already mounted in the housing 11, 20, 31 and is enclosed after introduction of the solid electrolyte 14. In this case, the housing 11, 21, 31 has an opening 12. The solid electrolyte 14 is arranged in the housing 11, 21, 31 such that the solid electrolyte 14 can come into contact with the measurement medium. The electrochemical half-cell 10, 30 produced in this way is suitable for use as a reference half-cell in an electrochemical sensor 1, 1', 1".

If the solid electrolyte 14 is introduced into the housing 11, 21, 31 in solid form, the electrical terminal lead 13, 23, 33 can be mounted in the solid electrolyte 14 by means of a hole previously created in the solid electrolyte 14.

According to a further third embodiment of the manufacturing method for an electrochemical half-cell, the opening 12, 32 is additionally closed by the junction 35 in addition to the second manufacturing method for the electrochemical half-cell described above. The electrochemical half-cell 10, 30 produced in this way is suitable for use as a reference half-cell 30 in an electrochemical sensor 1, 1', 1".

According to a further fourth embodiment of the manufacturing method for an electrochemical half-cell, the opening 12, 22 is additionally closed by the membrane 25 in addition to the second manufacturing method for the electrochemical half-cell described above. The electrochemical half-cell 10, 20 produced in this way is suitable for use as a measuring half-cell 20 in an electrochemical sensor 1, 1', 1".

According to a fifth embodiment of the manufacturing method for an electrochemical half-cell, if the solid electrolyte 14 was produced by the saline solution described above, in a next step, the nitrate is heated between 300° C. to 500° C., the carbonate is heated to above 500° C. The saline solution is subsequently spray-pyrolyzed into the housing 11 or onto a surface. The surface is, for example, a substrate that functions as a carrier for the solid electrolyte 14 or the electrical terminal lead 13. If the saline solution has been introduced into the housing 11 or applied to a substrate, the electrical terminal lead 13 is then introduced into the solid electrolyte 14. This can be done, for example, by drilling an opening into the solid electrolyte 14 and inserting the electrical terminal lead 13. The drilling diameter is preferably selected in such a way that the electrical terminal lead 13 comes into contact with the solid electrolyte 14 upon insertion into the hole. Other mounting methods that enable contact between the solid electrolyte 14 and the electrical terminal lead 13 are within the scope of the disclosure as known in the art. The substrate coated by the solid electrolyte 14 and connected to the electrical terminal lead 13 or the electrical terminal lead 13 coated with the solid electrolyte 14 can be additionally introduced into the housing 11 if desired.

The invention claimed is:

1. A method of manufacturing a solid electrolyte including a doped high-entropy oxide, the method comprising:
    mixing a first component,
        wherein the first component comprises at least one of oxides, carbonates and nitrates of each of the following substances: Mg, Co, Ni, Cu, and Zn;
    mixing the first component with at least one second component to form a first mixture,
        wherein the at least one second component comprises at least one of the oxides, carbonates and nitrates of ruthenium and platinum, and at least one of oxides, carbonates and nitrates of at least one of the following substances: Ga, Li, and Na;
    heating the first mixture to a temperature between 100° C. and 1300° C.; and
    aerating the heated first mixture such that the first mixture is quenched.

2. The method of manufacturing of claim 1,
    wherein, after the step of aerating, the first mixture further is:
    thermally compressed or melted or partially melted such that a water-impermeable substrate is formed; or
    cast into a polymer mass and autoclaved or tempered such that a homogeneous substrate is formed; or
    embedded in sol-gel.

* * * * *